Nov. 4, 1947.  F. A. DANIELS  2,430,328

V-BELT

Filed Jan. 31, 1945

RUBBER IMPREGNATED FABRIC—14  13—HARD FABRIC
RUBBER IMPREGNATED FABRIC
TEXTILE CORDS

13—HARD FABRIC
TEXTILE CORDS

INVENTOR.
Frederick Arthur Daniels
BY
Dean Fairbank & Hirsch
ATTORNEYS

Patented Nov. 4, 1947

2,430,328

UNITED STATES PATENT OFFICE 2,430,328

V-BELT

Frederick Arthur Daniels, Wilmington, Del.

Application January 31, 1945, Serial No. 575,375

12 Claims. (Cl. 74—233)

This invention relates to V-type belt drives as used for transmitting rotary motion between shafting and applies not only to the conventional V-type of drive in which both belt pulleys are grooved to receive the belt but also to the so-called "V-flat" type of drive in which one pulley only is grooved and in which power is transmitted to the other pulley by frictional contact with the underside of the belt.

For satisfactory operation it is desirable with either of these types of drive that the belt be of uniform cross-section and frictional characteristics throughout its length and such desiderata are reasonably assured if the belt is endless. However endless belts are not easily installed unless the pulleys happen to be in overhung relationship with respect to such obstructions as shaft bearings. In many applications, as for example in railroad electric lighting generator drives where motion is obtained from that portion of the axle located between the journals, installation of an endless V-belt often requires the dismantling of considerable portions of the machinery.

One objective of this invention therefore is to provide a construction approximating the operating smoothness of the conventional endless V-belt and yet capable of being easily installed without the need of dismantling any portion of the drive equipment.

A further objective of this invention is to provide a V-belt which can be manufactured in long continuous lengths from which portions may be cut to fit any reasonable drive conditions of shaft center distance and pulley sizes and which, because of its manufacture from relatively few basic moulds, will reduce the high investment associated with the manufacture of endless V-belts.

Figure 1:
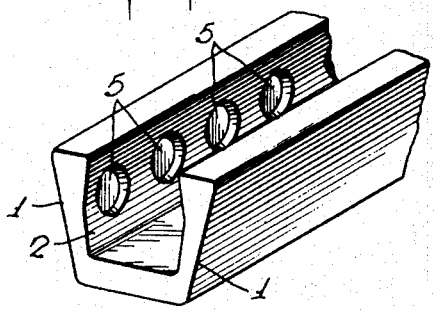
Figure 2:
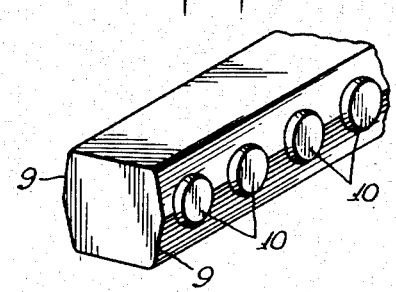
Figure 3:
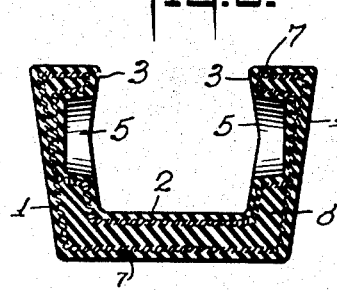
Figure 5:
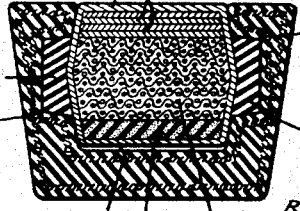
Figure 4:
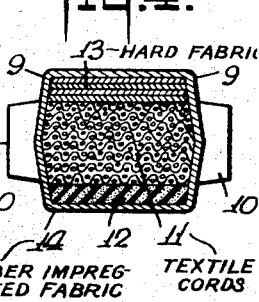
Figure 6:
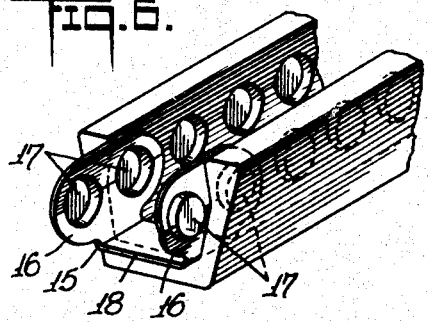
Figure 7:
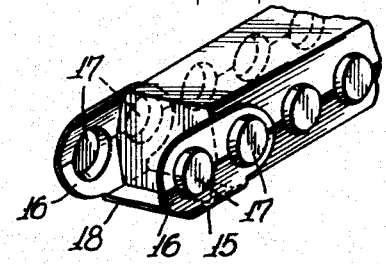
Figure 8:
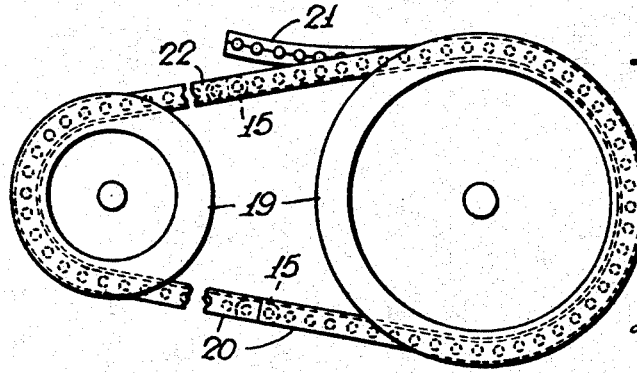

In the accompanying drawings:

Fig. 1 is an isometric view at the end of the cover or outer portion of the belt, Fig. 2 is an isometric view at the end of the core or inner portion of the belt, Fig. 3 is a cross-sectional view of the cover taken at right angles to the length of the belt and through the center of a pair of the cover recesses, Fig. 4 is a cross-sectional view of the core taken at right angles to the length of the belt and midway between a pair of the core projections, Fig. 5 is a cross-sectional view of the cover with the core assembled in its normal or unflexed position, taken at right angles to the length of the belt and through the center of a pair of the cover recesses, Fig. 6 is an isometric view of the joint connector shown in place in the end of the cover, Fig. 7 is an isometric view of the joint connector shown in place on the end of the core, Fig. 8 is an elevation of a typical drive installation showing the preferred location of the joints in the cover and core.

The belt proper consists of an outer portion of trapezoidal cross-section hereinafter referred to as the cover, and an inner portion referred to as the core.

The outside faces 1 (Figs. 1, 3 and 5) of the cover are tapered to suit the grooves in the pulleys with which it is to be used while its interior 2 (Figs. 1 and 3) is in the form of a channel adapted to receive the core shown in Fig. 2. This channel is preferably of such cross-section as to interlock with the core and prevent the latter from leaving the channel under the action of the centrifugal and other forces set up during use, and yet be adapted to permitting insertion of the core during assembly of the belt in its drive location. An effective form of channel embodying this preference is shown at 3 (Fig. 3) wherein its greatest width occurs approximately at the neutral axis 4 (Fig. 4) of the core but it is to be distinctly understood that the invention is not limited to this preference or construction but may utilise any shape of channel whether or not provided with means to interlock with the core. Both opposite sides of the channel are provided with a series of equally spaced recesses 5 (Figs. 1 and 3) preferably not extending completely through the side walls of the cover but the invention is not necessarily limited to this construction as, in place of the recesses, holes extending completely through the faces of the cover may be substituted particularly in the case of the smaller size belts where space limitations may make this construction desirable. The recesses in the opposite sides of the channel are in co-axial alignment and the channel is preferably of such depth that when the core is assembled in it a slight space 6 (Fig. 5) remains below the core to provide for the expansion or swelling of the lower portion of the core section when flexed by its passage over the pulleys.

The main purpose of the cover portion is to provide a member of suitable cross-section to engage the grooves of the pulleys with which the belt will be used and thus properly distribute the frictional forces developed during driving, and to transmit said forces to the core.

The cover construction shown in Fig. 3 indicates a combination of a woven fabric 7 suitably interfolded to provide adequate rigidity and a rubber composition 8 integrally molded to provide the desired physical dimensions and recesses, but this construction is illustrative only and other materials or manners of construction may be substituted without departing from the spirit of this invention.

The core (Figs. 2 and 4) is shaped to fit snugly into the cover channel 2 except that preferably its depth should be such that when assembled into the cover, and before flexing or bending, its underface should not contact the bottom of the channel. Both opposite sides 9 of the core are provided with a series of equally spaced projections 10 (Fig. 2 and 4) to engage with the recesses 5 in the cover channel and are intended to transmit to the core the tangential forces generated at the pulleys. The projections 10 are preferably truncated cones but may be of any other suitable form as for example truncated pyramids, cylindrical prisms, or other forms of prism provided they are adapted to transmit the forces applied by the cover. To minimise internal friction such projections should be located on or close to the neutral axis of the core since at this location the projections theoretically maintain their original spacing when the core is flexed.

The primary purpose of the core is to transmit the driving load and since the same underlying theoretical considerations apply as with conventional V-belts it is generally preferable to follow customary V-belt construction. On this basis the tensile load would be transmitted by the textile cords 11 (Fig. 4); plastic deformation of the belt and heat generation during flexure over the pulleys would be accommodated by the sponge rubber cushion section 12; lateral rigidity of the belt and minimisation of distortion of the belt cross-section during its passage over the pulleys would be resisted by the layer of hard fabric 13; while integration of the component parts of this construction and incorporation of the driving projections 10 would be obtained by the moulded rubber impregnated fabric binding 14.

In addition to the cover and core each belt assembly usually requires the use of two joint connectors 15 (Figs. 6 and 7). These are identical and consist of a blanked and formed spring metal stamping comprising two side links 16 each of which carries a pair of pockets 17 exactly fitting and having the same spacings as the channel recesses and core projections, and resiliently connected by a bridge 18 in such fashion that the two side links are held substantially in co-axial alignment. In Figs. 6 and 7 the bridge piece 18 is illustrated at such location that it will be concealed in space 6 (Fig. 5), but such location is not essential and the joint connector may be installed in inverted fashion so that bridge piece 18 is exposed and covers the butting surfaces of core joint.

The two portions of the belt proper, that is the cover and the core, are fabricated separately and afterwards assembled with the core embraced by the cover so that the projections 10 fit into the recesses 5, the sponge rubber cushion section 12 of the core being adjacent to the bottom of the channel, as in Fig. 5, under which conditions the composite belt should have essentially the same overall cross-sectional dimensions and be interchangeable physically with the conventional sizes of endless V-belts.

Installation of the applicant's belt involves cutting off a suitable length of the above described assembly, the cut being made exactly at right angles to the length of the belt and exactly midway between the most convenient pair of projections. The core is then removed from the cover and replaced so that approximately one-half of its length overhangs the end of the cover. This assembly is then placed over the pulleys 19 (Fig. 8) the ends 20 of the cover are butted together, and a joint connector 15 is forced into place to hold the cover in substantially endless condition as shown in Fig. 8. The overhanging portion 21 of the core can be easily sprung into place in the cover channel by rotating the pulleys so that the portion of the core undergoing insertion lies in the straight portion of the drive between the pulleys. To complete instllation of the belt both ends 22 of the core are pulled out from the cover groove sufficiently to permit another joint connector 15 to be placed in position in the cover channel following which the ends 22 of the core are forced back into place in the joint connector thereby rendering the core also essentially endless. The use of joint connectors is optional for belts carrying light loads or operating at low speed.

I claim:

1. A V-belt construction comprising in combination an outer one-piece fabric cover of U cross-section, said cover having a channel, opposite inner faces of which are provided with a series of equally spaced recesses located substantially along the neutral axis of the cover, and a removable closely fitting flexible linkless non-metallic inner one-piece fabric core with projections adapted to engage the recesses in said channel and resist longitudinal movement relative thereto.

2. A V-belt construction comprising in combination an outer one-piece fabric cover of U cross-section, said cover having a channel, opposite inner faces of which are provided with a series of equally spaced recesses located substantially along the neutral axis of the cover, a removable closely fitting flexible linkless non-metallic inner one-piece fabric core with projections adapted to engage the recesses in said channel and resist longitudinal movement relative thereto, the ends of said one piece outer cover and said one piece core being abutted and offset, and metallic jointing elements on the cover and the core each element comprising a pair of connected side links shaped to fit between the cover and core, each of said links provided with a pair of cup-like bosses spaced to fit over a pair of adjacent projections and into the corresponding pair of recesses and thereby enabling the jointing elements on the cover to connect the ends of the cover and the jointing elements on the core to connect the ends of the core.

3. A V-belt construction comprising in combination an outer one piece fabric cover of U cross-section, said cover having a channel, opposite inner faces of which are provided with a series of equally spaced recesses located substantially along the neutral axis of the cover, and a removable flexible link-less non-metallic inner one-piece fabric core with projections adapted to engage the recesses in said channel and resist longitudinal movement relative thereto, said core being of such depth that when inserted in said channel a small clearance is provided between said core and said channel to accommodate expansion of the core when the assembly is flexed.

4. A V-belt construction comprising in combination an outer one piece fabric cover of U cross-section, said cover having a channel, opposite inner faces of which are provided with a series of equally spaced recesses located substantially along the neutral axis of the cover, a removable one piece inner core with projections adapted to engage the recesses in said channel and resist longitudinal movement relative thereto, said core shaped to interlock with said channel and retard extraction therefrom, said core being of such depth that when inserted in said channel a small clearance is provided between said core and said channel to accommodate expansion of the said core when the assembled cover and core are unitarily flexed, and metallic jointing elements on said cover and said core each element comprising a pair of connected side links shaped to fit between the cover and core, each of said links being provided with a pair of cup-like bosses spaced to fit over a pair of adjacent projections and into the corresponding pair of recesses and thereby enabling the jointing elements on the cover to connect the ends of the cover and the jointing elements on the core to connect the ends of the core.

5. A driving belt connection comprising a U-shaped casing fabric element and a readily removable central fabric element of a flexible composition inserted within said casing element, one of said elements being provided with a plurality of lateral recesses and the other element being provided with a plurality of lateral projections engaging said recesses.

6. A driving belt connection having a fabric casing provided with a U-shaped cross section with a flat bottom and downwardly converging exterior side walls and first outwardly diverging and then inwardly converging interior side walls, and a removable fabric central element of a flexible composition fitted in said casing and closely grasped between said interior side walls.

7. A driving belt connection comprising a fabric casing element and a removable central fabric core element of a flexible composition inserted within said casing element, one of said elements being provided with a plurality of lateral recesses and the other element being provided with a plurality of lateral projections engaging said recesses, the ends of said casing and central elements being abutted at different places and the abutted ends being held in abutment by interengagement of said recesses and projections.

8. A driving belt connection comprising a fabric casing element and a removable central fabric core element of a flexible composition inserted within said casing element, one of said elements being provided with a plurality of lateral recesses and the other element being provided with a plurality of lateral projections engaging said recesses, the ends of the casing and central elements being abutted together in offset relationship, and metal clip elements with correspondingly shaped recesses and projections engaging said first mentioned recesses and projections to clip together abutted ends of said central and casing elements across said abutments.

9. In a fabric V-belt, a substantially U-cross-section outer fabric cover element and a removable inner fabric core element of a flexible composition, said core element being wedged in between the legs of the U-cross section cover element, the contacting interior sides of the legs of the cover element and the exterior sides of the core being respectively provided with interengaging recesses and bosses.

10. In a fabric V-belt, a substantially U-cross-section outer fabric cover element and a removable inner fabric core element of a flexible composition, said core element being wedged in between the legs of the U-cross-section cover element, the inside faces of the legs of the U being recessed and the outside faces of the core adjacent thereto being extended outwardly to engage said recessed faces.

11. A pulley-engaging fabric cover element for a V-belt construction to distribute frictional driving forces and transmit said forces to a core, comprising a continuous length of a substantially U-cross-section cover having converging power transmitting faces on its exterior sides and a flat power-transmitting face on its bottom, said cover element being formed of a woven fabric interfolded to provide adequate rigidity and an integrating rubber composition molded upon and encompassing said woven fabric, the interior faces of the interior sides of said U-cross-section being divergent downwardly from the upper ends of the U-cross-section and then convergent downwardly and being provided with spaced lateral recesses along the neutral axis thereof for engaging said core.

12. A load transmitting fabric core element for a V-belt comprising a continuous length of core, said core element being formed of a lower exterior section of a longitudinally extending sponge rubber cushion section to accommodate plastic deformations and dissipate the heat generated, a central interior section of load transmitting textile cords, and an upper interior section of hard fabric to minimize distortion of the belt cross-section, and a molded rubber impregnated fabric binding enclosing and encasing said lower, central and upper sections, the sides of said core first diverging and converging downwardly from top to bottom and being provided with a plurality of bosses laterally projecting from the sides of the core along the neutral axis thereof.

FREDERICK ARTHUR DANIELS.

REFERENCES CITED

The following references are of record in the file of this patent:

UNITED STATES PATENTS

| Number | Name | Date |
| --- | --- | --- |
| 1,106,355 | Bohlman | Aug. 4, 1914 |
| 1,424,767 | Mesinger | Aug. 8, 1922 |
| 2,224,068 | Togel | Dec. 3, 1940 |

FOREIGN PATENTS

| Number | Country | Date |
| --- | --- | --- |
| 161,908 | Great Britain | Apr. 21, 1921 |